(12) United States Patent
Machii et al.

(10) Patent No.: US 9,377,897 B2
(45) Date of Patent: Jun. 28, 2016

(54) CONTROL OF COORDINATE INPUT APPARATUS BASED ON LIGHT DISTRIBUTION AND MOVING AMOUNTS OF SENSOR UNITS

(71) Applicant: CANON KABUSHIKI KAISHA, Tokyo (JP)

(72) Inventors: Ritsuo Machii, Tokyo (JP); Katsuyuki Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 13/948,380

(22) Filed: Jul. 23, 2013

(65) Prior Publication Data
US 2014/0034807 A1 Feb. 6, 2014

(30) Foreign Application Priority Data
Aug. 3, 2012 (JP) ................... 2012-173281

(51) Int. Cl.
*G06F 3/041* (2006.01)
*G06F 3/042* (2006.01)
*G01B 11/00* (2006.01)

(52) U.S. Cl.
CPC ............ *G06F 3/0418* (2013.01); *G01B 11/002* (2013.01); *G06F 3/0421* (2013.01); *G06F 3/0428* (2013.01)

(58) Field of Classification Search
CPC ......... G06F 3/0421; G06F 3/00; G06F 3/042; G06F 3/0428; G06F 3/0488; G06F 3/03548; G06F 3/03547; G06F 3/038; G06F 3/0362; G06F 3/0423; G06F 3/0425; G06F 3/0418; G01B 11/002

USPC ............. 250/221, 239, 234, 216, 206.1; 345/157, 158, 173, 175, 178; 356/614, 356/615, 621, 622, 623; 178/18.01, 18.03, 178/18.09
See application file for complete search history.

(56) References Cited

U.S. PATENT DOCUMENTS

| 4,507,557 A | 3/1985 | Tsikos |
| 4,886,943 A | 12/1989 | Suzuki et al. |

(Continued)

FOREIGN PATENT DOCUMENTS

| JP | 2000-105671 A | 4/2000 |
| JP | 2001-43021 A | 2/2001 |

(Continued)

OTHER PUBLICATIONS

U.S. Appl. No. 13/973,651, filed Aug. 22, 2013 Applicant: Akihiro Matsushita, et al.

(Continued)

*Primary Examiner* — Que T Le
*Assistant Examiner* — Jennifer Bennett
(74) *Attorney, Agent, or Firm* — Fitzpatrick, Cella, Harper & Scinto

(57) ABSTRACT

The sensor unit of each of a first bar housing unit and second bar housing unit is moved. The moving amount is measured and stored. The distribution of a light amount received by the light receiving unit of the sensor unit of each of the first bar housing unit and second bar housing unit is detected, and whether the moving amount is appropriate is determined based on the detection result. A calculation value used when the coordinates of the pointed position in the coordinate input effective region are calculated based on variations of the light amount distribution is corrected by using the moving amount stored when it is determined that the moving amount is appropriate.

11 Claims, 13 Drawing Sheets

(56) References Cited

U.S. PATENT DOCUMENTS

| | | | |
|---|---|---|---|
| 4,887,245 | A | 12/1989 | Mori et al. |
| 4,910,363 | A | 3/1990 | Kobayashi et al. |
| 4,931,965 | A | 6/1990 | Kaneko et al. |
| 4,980,518 | A | 12/1990 | Kobayashi et al. |
| 5,070,325 | A | 12/1991 | Tanaka et al. |
| 5,097,102 | A | 3/1992 | Yoshimura et al. |
| 5,142,106 | A | 8/1992 | Yoshimura et al. |
| 5,239,138 | A | 8/1993 | Kobayashi et al. |
| 5,500,492 | A | 3/1996 | Kobayashi et al. |
| 5,539,678 | A | 7/1996 | Tanaka et al. |
| 5,565,893 | A | 10/1996 | Sato et al. |
| 5,714,698 | A | 2/1998 | Tokioka et al. |
| 5,726,686 | A | 3/1998 | Taniishi et al. |
| 5,736,979 | A | 4/1998 | Kobayashi et al. |
| 5,805,147 | A | 9/1998 | Tokioka et al. |
| 5,818,429 | A | 10/1998 | Tanaka et al. |
| 5,831,603 | A | 11/1998 | Yoshimura et al. |
| 5,936,207 | A | 8/1999 | Kobayashi et al. |
| 6,335,724 | B1 | 1/2002 | Takekawa et al. |
| 6,415,240 | B1 | 7/2002 | Kobayashi et al. |
| 6,429,856 | B1 | 8/2002 | Omura et al. |
| 6,570,103 | B1 | 5/2003 | Saka et al. |
| 6,636,199 | B2 | 10/2003 | Kobayashi |
| 6,862,019 | B2 | 3/2005 | Kobayashi et al. |
| 7,075,524 | B2 | 7/2006 | Kobayashi et al. |
| 7,486,281 | B2 | 2/2009 | Kobayashi et al. |
| 7,538,894 | B2 | 5/2009 | Kobayashi |
| 7,965,904 | B2 | 6/2011 | Kobayashi |
| 8,982,102 | B2 * | 3/2015 | Takano .............. G06F 3/0421 345/173 |
| 2001/0019325 | A1 * | 9/2001 | Takekawa .......... G06F 3/0423 345/157 |
| 2011/0157044 | A1 | 6/2011 | Yu |
| 2011/0164114 | A1 | 7/2011 | Kobayashi et al. |
| 2011/0304535 | A1 | 12/2011 | Machii |
| 2012/0065929 | A1 | 3/2012 | Yoshimura |
| 2012/0113057 | A1 | 5/2012 | Kobayashi et al. |
| 2013/0234955 | A1 | 9/2013 | Takano et al. |
| 2013/0238124 | A1 | 9/2013 | Suzuki et al. |
| 2013/0257814 | A1 | 10/2013 | Kobayashi et al. |

FOREIGN PATENT DOCUMENTS

| | | |
|---|---|---|
| JP | 2001-142642 A | 5/2001 |
| JP | 2004-272353 A | 9/2004 |
| JP | 4118664 B | 7/2008 |

OTHER PUBLICATIONS

U.S. Appl. No. 13/936,923, filed Jul. 8, 2013 Applicant: Kiwamu Kobayashi.

U.S. Appl. No. 13/973,651, filed Aug. 22, 2013 Applicants: Akihiro Matsushita, et al.

* cited by examiner

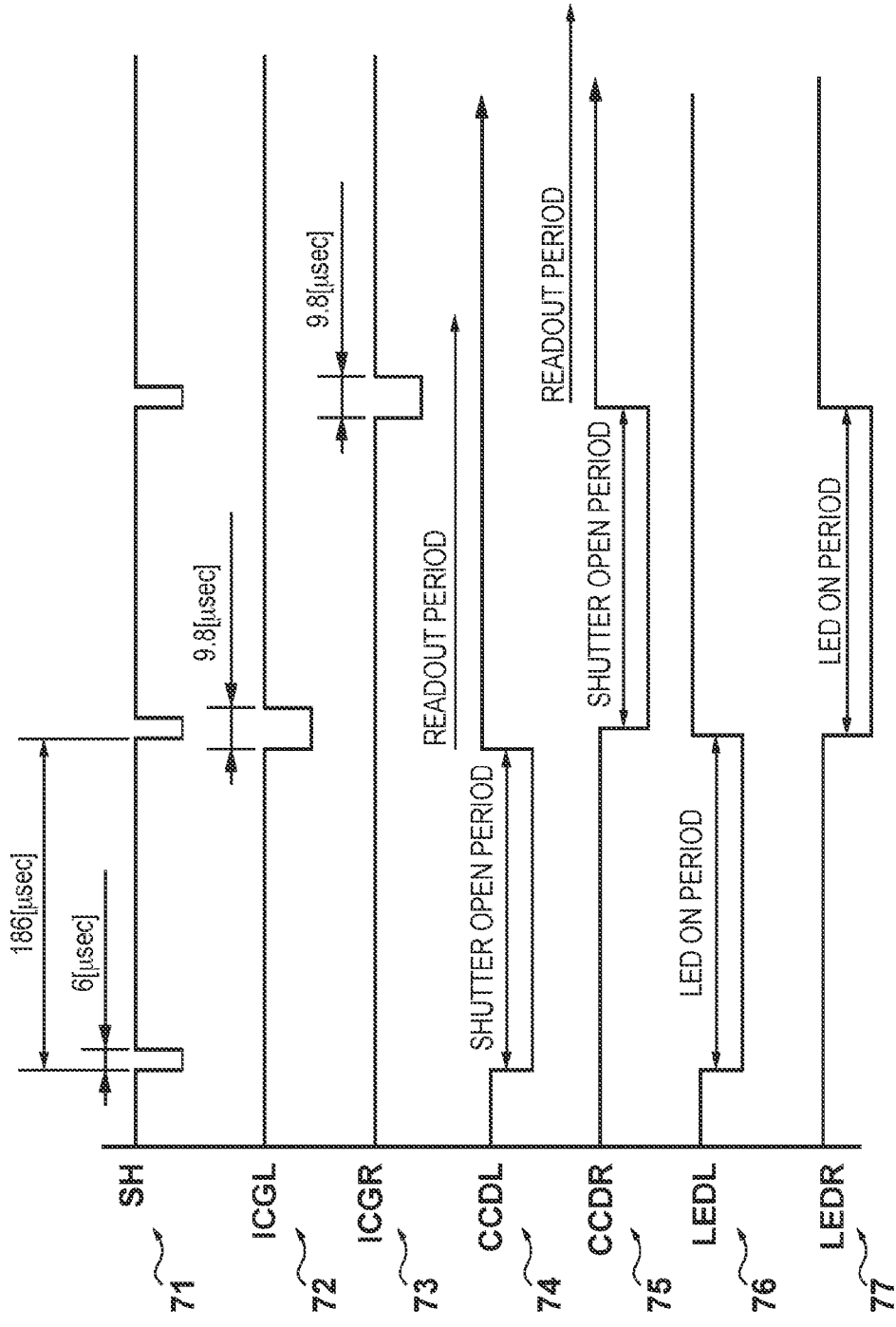

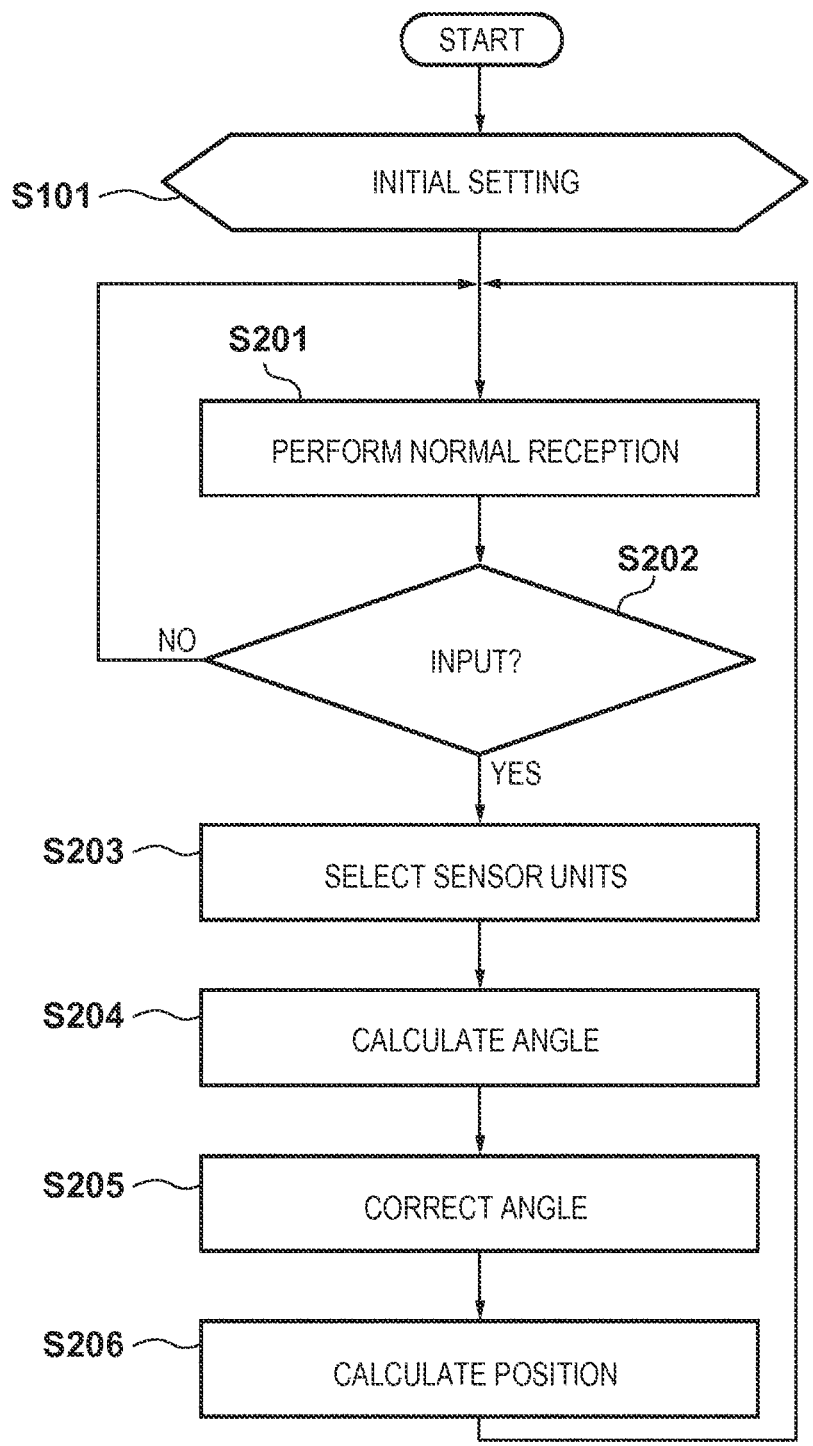

F I G. 9A    F I G. 9B
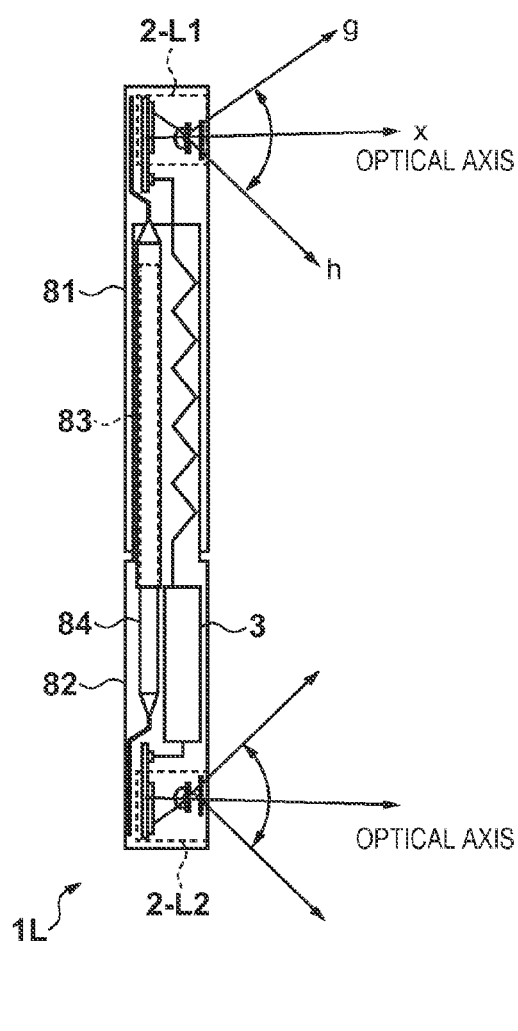
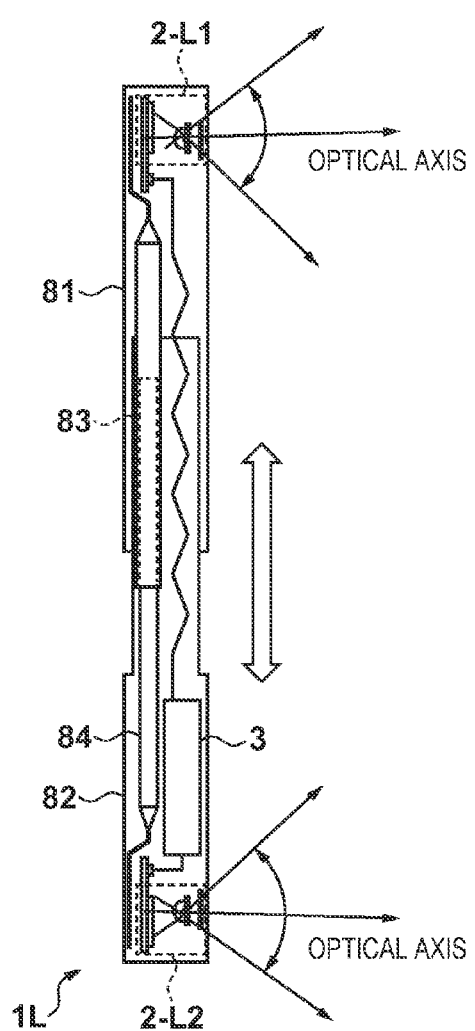

CONTROL OF COORDINATE INPUT APPARATUS BASED ON LIGHT DISTRIBUTION AND MOVING AMOUNTS OF SENSOR UNITS

BACKGROUND OF THE INVENTION

1. Field of the Invention

The present invention relates to a coordinate input apparatus which optically detects a coordinate position input to a coordinate input surface by a pointer such as a finger in order to input or select information. Particularly, the present invention relates to a detachable portable coordinate input apparatus.

2. Description of the Related Art

There is a coordinate input apparatus used to control a connected computer and write a character, figure, and the like by inputting coordinates to a coordinate input surface by pointing with a pointer (for example, a special-purpose input pen or finger).

As such coordinate input apparatuses, various types of touch panels have conventionally been proposed and commercialized. The coordinate input apparatuses are widely used because a terminal such as a personal computer can be easily operated on the screen without using a special tool or the like.

Coordinate input methods range from a method using a resistive film to a method using an ultrasonic wave. A method using light is disclosed in, for example, U.S. Pat. No. 4,507,557. In U.S. Pat. No. 4,507,557, a retroreflecting sheet is arranged outside a coordinate input region. The angle between a shielding member such as a finger which cuts off light in the coordinate input region, and a light receiving unit is detected by using an illumination unit configured to emit light and the light receiving unit configured to receive light, which are arranged at the corner of the coordinate input region. In U.S. Pat. No. 4,507,557, the position pointed by the shielding member is determined based on the detection result.

As apparatuses having similar arrangements, for example, Japanese Patent Laid-Open Nos. 2000-105671 and 2001-142642 disclose coordinate input apparatuses in which a retroreflecting member is arranged around a coordinate input region, and the coordinates of a portion (light shielding portion) where retroreflected light is cut off are detected.

Of these apparatuses, for example, the apparatus in Japanese Patent Laid-Open No. 2000-105671 detects the angle of a light shielding portion with respect to the light receiving unit by detecting, by waveform processing calculation such as differentiation, the peak of the light shielding portion by a shielding member that is received by the light receiving unit, and calculates the coordinates of the shielding member based on the detection result. Japanese Patent Laid-Open No. 2001-142642 discloses an arrangement in which one end and the other end of a light shielding portion are detected by comparison with a specific level pattern, and the center between their coordinates is detected.

A method of detecting a light shielding position and calculating its coordinates, as in U.S. Pat. No. 4,507,557 and Japanese Patent Laid-Open Nos. 2000-105671 and 2001-142642, will be called a light shielding method.

It is conceivable to configure the above-described coordinate input apparatus to be freely attachable to and detachable from a plate surface such as a whiteboard. The detachable apparatus arrangement enables the user to bring the apparatus into a place where he wants to use the system when he wants to use it, attach the apparatus to a whiteboard or the like, and use it.

At this time, however, the apparatus is attached in various ways depending on the user. The building components of the apparatus, such as a sensor, are not always attached at high precision, unlike assembly in a factory.

As an example of the detachable apparatus arrangement, sensor units are arranged at the two ends of each of bar-like housing units, and a retroreflecting member is arranged on the side surface of each housing unit. The bar-like housing units are arranged on facing sides of a rectangular coordinate input effective region so that the retroreflecting members arranged on the housing units face each other straightly. The user attaches the portable bar-like housing units on the left and right, or top and bottom of the almost rectangular coordinate input region. The user can use a wall surface or whiteboard he wants as the coordinate input surface. The display surface of a display apparatus is made to almost coincide with the coordinate input effective region. The display surface can therefore be used as an interactive display capable of display control by a touch operation or the like.

With this arrangement, the user can set the coordinate input effective region to an arbitrary size. In addition to the advantage of portability by detachment, the system can cope with various projected image sizes of a front projector depending on the user.

To calculate the coordinates of a touch position at high accuracy in this system, the positions of four sensor units at the respective ends of the paired bar-like housing units need to be grasped accurately. To accurately grasp the position of a given sensor unit, the two sensor units of the facing bar-like housing unit need to be positioned within the view angle of the light receiving unit of the given sensor unit. That is, the bar-like housing units need to be arranged so that the light receiving unit of the given sensor unit can detect pieces of angle information of the two sensor units in the facing bar-like housing unit.

However, the installation state may not satisfy the above condition if the positions of the bar-like housing units shift or are not parallel depending on installation of the bar-like housing units by the user. To avoid this, fine work instructions may be issued in installation by the user, but such specifications hinder easy setup and greatly impair user friendliness.

SUMMARY OF THE INVENTION

The present invention provides a detachable coordinate input apparatus which includes bar-like housing units and implements easy setup by the user and high-accuracy coordinate calculation.

To achieve the above object, a coordinate input apparatus according to the present invention comprises the following arrangement.

That is, a coordinate input apparatus in which a first bar housing unit and a second bar housing unit each including at least two sensor units each formed from a light projecting unit and a light receiving unit, and a retroreflecting member are arranged on two facing sides of a coordinate input effective region to make the retroreflecting members face each other, and which detects a pointed position in the coordinate input effective region, comprising: a moving unit configured to move the sensor unit of each of the first bar housing unit and second bar housing unit; a moving amount measurement unit configured to measure and store a moving amount by the moving unit; a moving amount determination unit configured to detect a distribution of a light amount received by the light receiving unit of the sensor unit of each of the first bar housing unit and second bar housing unit, and determine, based on a detection result, whether the moving amount by the moving unit is appropriate; and a correction unit configured to correct a calculation value used when coordinates of the pointed position in the coordinate input effective region are calculated based on variations of the light amount distribution by using the moving amount stored in the moving amount measurement unit when the moving amount determination unit determines that the moving amount by the moving unit is appropriate.

As described above, the present invention implements easy setup by the user and high-accuracy coordinate calculation in a detachable coordinate input apparatus including bar-like housing units.

Further features of the present invention will become apparent from the following description of exemplary embodiments (with reference to the attached drawings).

BRIEF DESCRIPTION OF THE DRAWINGS

FIG. 3B is a timing chart according to the first embodiment;

FIG. 8B is a flowchart for explaining an operation of the sensor unit according to the first embodiment;

FIG. 9A is a view for explaining the arrangement of a bar housing unit according to the second embodiment; and FIG. 9B is a view for explaining the arrangement of the bar housing unit according to the second embodiment.

DESCRIPTION OF THE EMBODIMENTS

Embodiments of the present invention will now be described in detail with reference to the accompanying drawings. Note that arrangements set forth in the following embodiments are merely examples, and the present invention is not limited to illustrated arrangements.

First Embodiment

The schematic arrangement of a coordinate input apparatus according to the first embodiment will be described with reference to FIG. 1.

Figure 1:
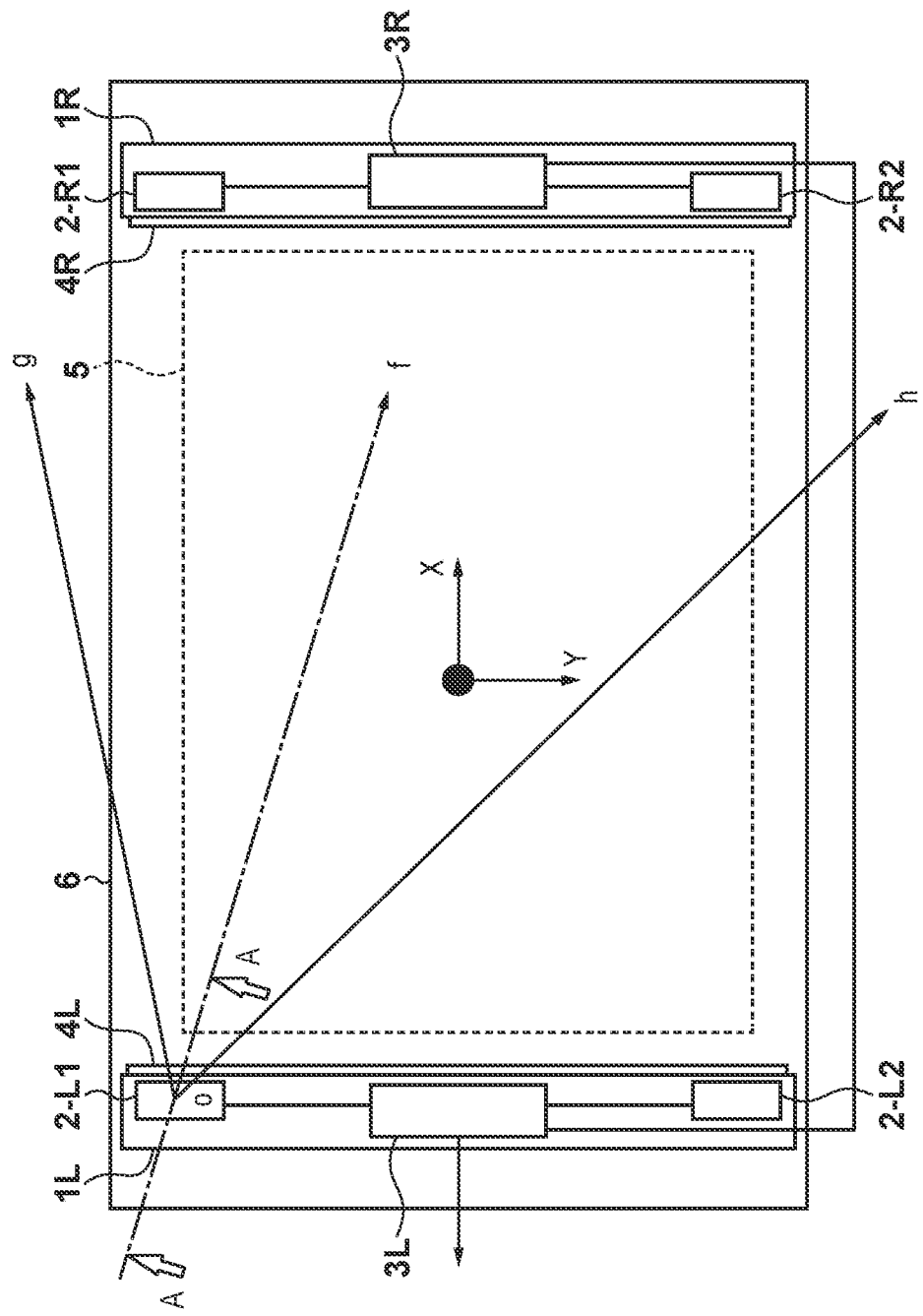
FIG. 1 is a view showing the schematic arrangement of an overall coordinate input apparatus according to the first embodiment.

In FIG. 1, bar-like housing units (to be simply referred to as bar housing units hereinafter) 1L and 1R include at least two sensor units 2-L1 and 2-L2, and two sensor units 2-R1 and 2-R2, respectively.

The bar housing units 1L and 1R (to be generically referred to as bar housing units 1) are arranged on two facing sides of a rectangular coordinate input effective region 5, as shown in FIG. 1. If a display apparatus is a front projector, the display region is set within the coordinate input effective region 5 and on the same plane, and an image is projected to, for example, a flat whiteboard 6. Needless to say, the display region is not limited to the whiteboard 6 and may be a wall surface or the like.

Retroreflecting members 4L and 4R (to be generically referred to as retroreflecting members 4) are mounted on the side surfaces of the bar housing unit 1L (first bar housing unit) and bar housing unit 1R (second bar housing unit). Each of the retroreflecting members 4L and 4R is configured to retroreflect an infrared ray projected by the sensor unit of the bar housing unit 1L or 1R arranged on a facing side.

The bar housing unit 1L incorporates the sensor units 2-L1 and 2-L2, and the bar housing unit 1R incorporates the sensor units 2-R1 and 2-R2. An arithmetic control circuit 3L incorporated in the bar housing unit 1L controls the sensor units 2-L1 and 2-L2, performs arithmetic processing for their output results, and controls an arithmetic control circuit 3R of the bar housing unit 1R. The arithmetic control circuit 3R of the bar housing unit 1R controls the sensor units 2-R1 and 2-R2, performs arithmetic processing for their output results, and transmits the results to the arithmetic control circuit 3L of the bar housing unit 1L. The arithmetic control circuit 3L of the bar housing unit 1L processes output results from the four sensor units 2-L1, 2-L2, 2-R1, and 2-R2, calculates the touch position, and outputs the result to an external device such as a personal computer.

In FIG. 1, the arithmetic control circuit 3L of the bar housing unit 1L and the arithmetic control circuit 3R of the bar housing unit 1R are connected by a code (that is, wired), but the present invention is not limited to this. For example, the arithmetic control circuits 3L and 3R may have a wireless communication function and transmit/receive data by using the communication function (wireless connection).

In the following description, the horizontal direction is the X-axis (positive on the right side in the drawing), and the vertical direction is the Y-axis (positive on the down side).

Figure 2A:
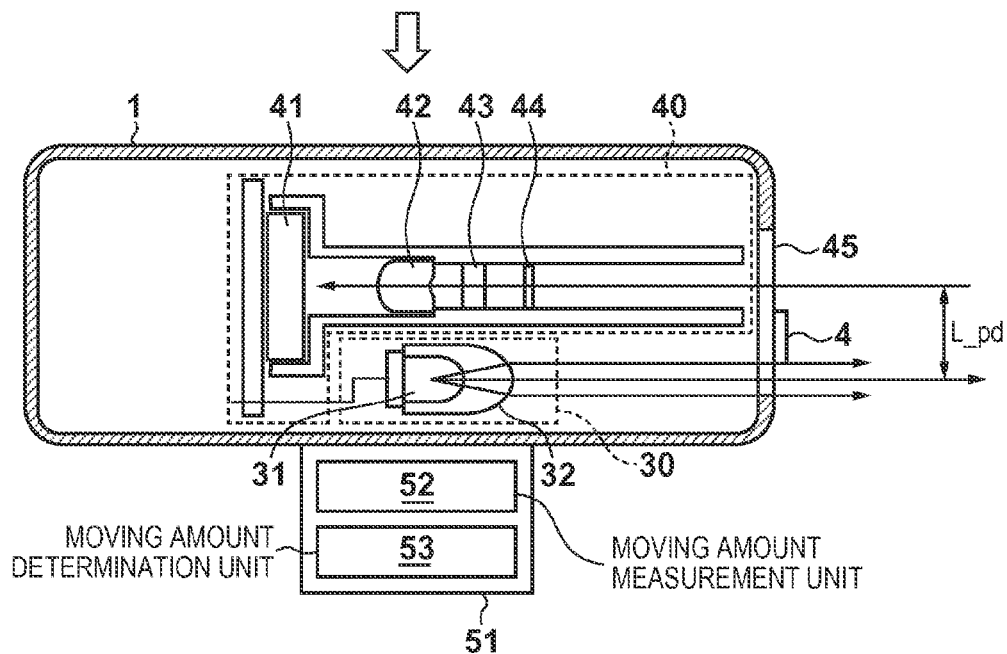
FIG. 2A is a view showing the arrangement of a light projection unit and light receiving unit in a sensor unit according to the first embodiment.
Figure 2B:
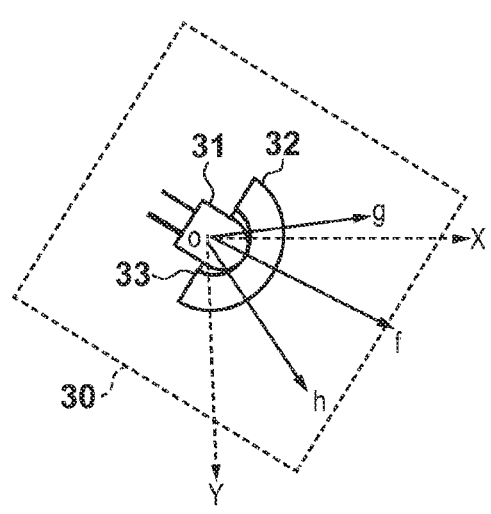
FIG. 2B is a view showing the arrangement of the light projection unit and light receiving unit in the sensor unit according to the first embodiment.
Figure 2C:
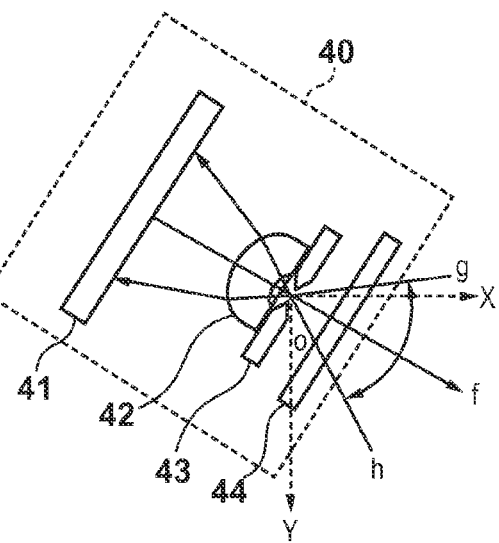
FIG. 2C is a view showing the arrangement of the light projection unit and light receiving unit in the sensor unit according to the first embodiment.

FIGS. 2A to 2C are views showing the detailed arrangement of the sensor units 2-L1, 2-L2, 2 R1, and 2-R2 (to be generically referred to as sensor units 2). FIG. 2A is a sectional view taken along a line A-A in FIG. 1, and FIGS. 2B and 2C are front views when viewed from a direction indicated by an arrow in FIG. 2A.

In FIG. 2A, the sensor unit 2 is housed in the bar housing unit 1 and formed from a light projection unit 30 and light receiving unit 40. The distance between the light projection unit 30 and the light receiving unit 40 is L_pd, and the retroreflecting member 4 is interposed between them as shown in FIG. 2A. A light transparent member 45 is a protection member for preventing entrance of a foreign substance such as dust into the bar housing unit 1.

In FIG. 2B, the light projection unit 30 includes an infrared LED 31 serving as a light emitting unit, a projection lens 32, and an adhesion layer 33 for fixing them. The projection lens 32 is configured to change light from the infrared LED 31 into a beam almost parallel to the whiteboard 6 serving as the coordinate input surface. The light projection unit 30 emits a fan-like beam having a vertex at the position of a point O (the barycentric position of the sensor unit 2) in a light projection range of g to h so as to illuminate the entire region of the retroreflecting member 4 of the bar housing unit 1 arranged on a facing side. At this time, the optical axis of the light projection unit 30 is set in the direction f.

In FIG. 2C, the light receiving unit 40 detects light which has been projected by the light projection unit 30 and retroreflected by the retroreflecting member 4 mounted on the bar housing unit 1 arranged on a facing side. Reference numeral 41 denotes a line CCD serving as a photoelectric converter; 42, a light receiving lens; 43, a field stop; and 44, an infrared pass filter. The infrared pass filter 44 may be omitted by giving the infrared pass filter function to a protection member 45.

The optical axis of the light receiving unit 40 is set in the direction f. The field range is a range of g to h, and the position of the point O serves as an optical center position. As shown in FIG. 2C, the light receiving unit 40 is an optical system asymmetric to the optical axis. The light projection unit 30 and light receiving unit 40 are arranged to overlap each other, as shown in FIG. 2A, so that the positions of the points O, the directions g, and the directions h substantially coincide with each other. Since the light receiving unit 40 condenses light to a pixel of the line CCD 41 in accordance with the direction of incident light, the pixel number of the line CCD 41 represents angle information of incident light.

The sensor unit 2 is configured to be rotatable about the point O serving as the central axis because of the following reason. A rotation mechanism 51, and a moving amount measurement unit 52 such as an encoder for measuring the rotation amount (moving amount) are arranged for the sensor unit. The rotation mechanism 51 may be rotated by a manual operation by an operator or an automatic operation by a driving mechanism such as a motor. When the rotation mechanism 51 is rotated by the manual operation, a message indicative of this is notified to stop the manual operation by the operator based on the determination result of a moving amount determination unit 53 which determines whether the rotation amount is appropriate. When the rotation mechanism 51 is rotated by an automatic operation by the driving mechanism such as a motor, the rotation operation stops at a position corresponding to an appropriate rotation amount. The moving amount measurement unit 52 stores an amount of rotation from a reference state, and the information is used for angle information correction.

Note that the effect of arranging the rotation mechanism 51, moving amount measurement unit 52, and moving amount determination unit 53, and the like will be described later. The outline of the coordinate input apparatus will be explained continuously.

Figure 3A:
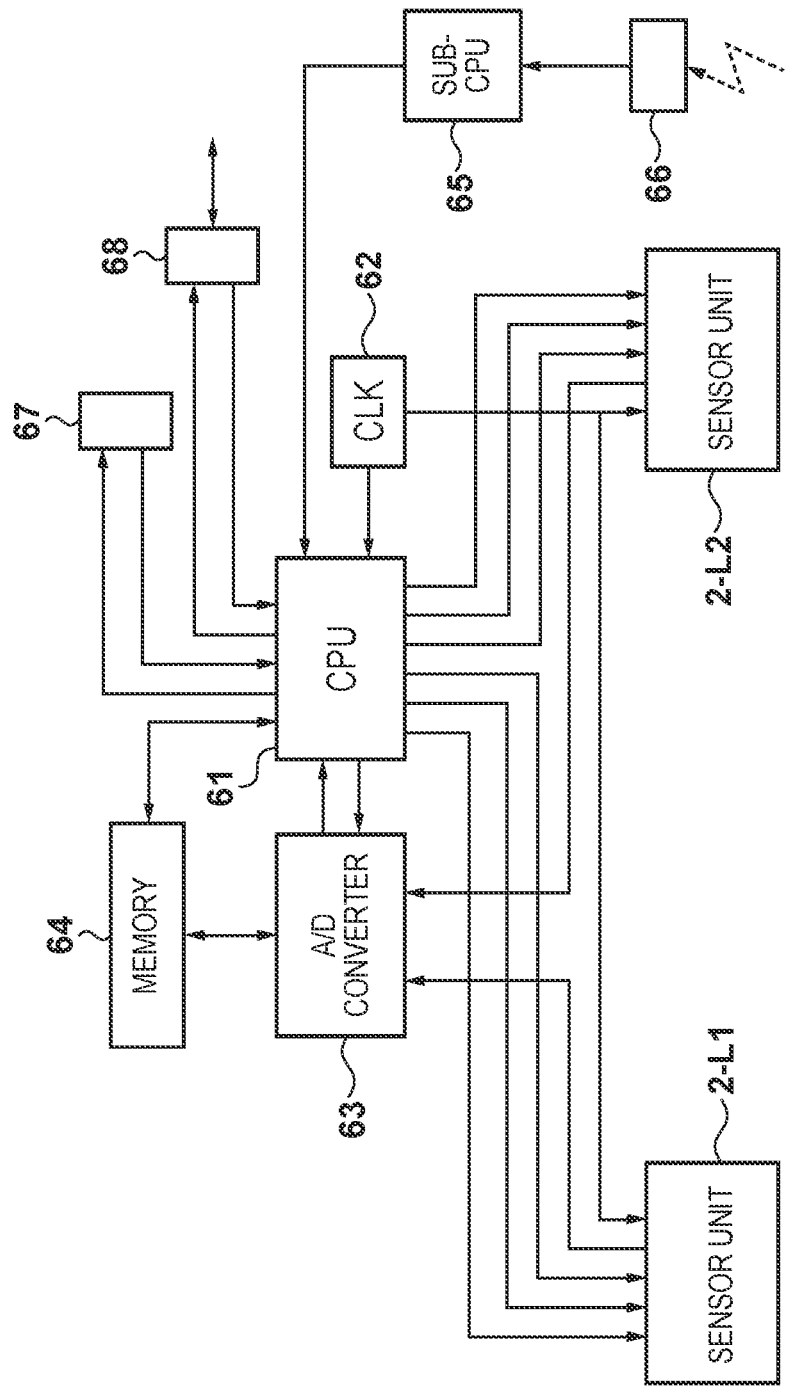
FIG. 3A is a block diagram showing the arrangement of an arithmetic control circuit 3 according to the first embodiment.

FIG. 3A is a block diagram showing the arithmetic control circuit 3. The arithmetic control circuit 3L of the bar housing unit 1L and the arithmetic control circuit 3R of the bar housing unit 1R in the first embodiment have the same circuit arrangement except for an external interface specification, and perform control of the corresponding connected sensor units 2 and calculation. FIG. 3A particularly shows the arrangement of the arithmetic control circuit 3L of the bar housing unit 1L.

A CPU 61 formed from a one-chip microcomputer or the like outputs CCD control signals for the line CCDs 41 of the sensor units 2-L1 and 2-L2, and performs output control of the shutter timings and data of the line CCDs 41, and the like. CCD clocks are transmitted from a clock generator CLK 62 to the sensor units 2-L1 and 2-L2, and also input to the CPU 61 in order to perform various control operations in synchronism with the line CCDs 41. Note that the CPU 61 supplies LED driving signals for driving the infrared LEDs 31 of the sensor units 2-L1 and 2-L2.

An A/D converter 63 receives detection signals from the line CCDs 41 of the sensor units 2-L1 and 2-L2, and converts them into digital values under the control of the CPU 61. A memory 64 stores the converted digital values to use them for angle calculation. A geometric touch position is calculated from the calculated angle information, and output to an information processing apparatus such as an external PC via an interface 68 (for example, a USB interface).

As described above, the arithmetic control circuit 3 of each bar housing unit 1 controls the two sensor units 2. If the arithmetic control circuit 3L of the bar housing unit 1L serves as the main function, the CPU 61 transmits a control signal to the arithmetic control circuit 3R of the bar housing unit 1R via a serial communication unit 67 to synchronize the circuits. Then, the CPU 61 acquires necessary data from the arithmetic control circuit 3R.

The operation between the arithmetic control circuits 3L and 3R is executed by master-slave control. In the first embodiment, the arithmetic control circuit 3L serves as the master, and the arithmetic control circuit 3R serves as the slave. Note that each arithmetic control circuit can become either the master or slave, and a switching unit such as a DIP switch (not shown) can switch the arithmetic control circuit between the master and the slave by inputting a switching signal to the CPU port.

To acquire data from the sensor units 2-R1 and 2-R2 of the bar housing unit 1R arranged on a facing side, the arithmetic control circuit 3L of the bar housing unit 1L serving as the master transmits a control signal to the arithmetic control circuit 3R serving as the slave via the serial communication unit 67. Angle information obtained by the sensor units 2-R1 and 2-R2 is calculated and transmitted to the arithmetic control circuit 3L serving as the master via the serial communication unit 67.

In the first embodiment, the interface 68 is mounted on the arithmetic control circuit 3L serving as the master. An infrared light receiving unit 66 is a pointer when a special-purpose pen (not shown) for emitting an infrared ray is used. A sub-CPU 65 decodes a signal from the special-purpose pen. The special-purpose pen includes a switch which detects pressing of the input surface by the pen tip, and various switches arranged on the side of the pen housing. The operation state of the special-purpose pen can be detected by transmitting the states of these switches and pen identification information from an infrared light emitting unit arranged in the special-purpose pen.

FIG. 3B is a timing chart showing control signals output from the CPU 61 of the arithmetic control circuit 3L serving as the master to operate the sensor unit 2, and the operation of the sensor unit 2.

Reference numerals 71, 72, and 73 denote control signals for controlling the line CCD 41. The interval of the SH signal 71 determines the shutter open time of the line CCD 41. The ICGL signal 72 is a gate signal to the sensor units 2-L1 and 2-L2 of the bar housing unit 1L, and is a signal for transferring charges in the photoelectric converter of the line CCD 41 to a readout unit.

A CCDL signal 74 is a signal representing the shutter open time of the line CCDs 41 of the sensor units 2-L1 and 2-L2. The ICGR signal 73 is a gate signal to the sensor units 2-R1 and 2-R2 of the facing bar housing unit 1R, and is transmitted to the arithmetic control circuit 3R of the bar housing unit 1R via the serial communication unit 67. Then, the arithmetic control circuit 3R generates a signal for transferring charges in the photoelectric converter of the line CCD 41 to the readout unit. A CCDR signal 75 is a signal representing the shutter open time of the line CCDs 41 of the sensor units 2-R1 and 2-R2.

An LEDL signal 76 and LEDR signal 77 are driving signals for the infrared LEDs 31 of the sensor units 2. To turn on the infrared LEDs 31 of the sensor units 2-L1 and 2-L2 of the bar housing unit 1L in the first cycle of the SH signal 71, the LEDL signal 76 is supplied to the infrared LEDs 31 via LED driving circuits (not shown).

To turn on the infrared LEDs 31 of the sensor units 2-R1 and 2-R2 of the bar housing unit 1R arranged on a facing side in the next cycle of the SH signal 71, the LEDR signal 77 is transmitted to the arithmetic control circuit 3R via the serial communication unit 67. Then, the arithmetic control circuit 3R generates a signal to be supplied to the LED driving circuits.

After the end of driving the infrared LED 31 and opening the shutter of the line CCD 41, a signal from the line CCD 41 is read out from the sensor unit 2, and angle information is calculated by a method to be described later. The arithmetic result of the arithmetic control circuit 3R serving as the slave is transmitted to the arithmetic control circuit 3L serving as the master.

By the above-described operation, the sensor units 2-L1 and 2-L2 of the bar housing unit 1L and the sensor units 2-R1 and 2-R2 of the facing bar housing unit 1R operate at different timings. With this arrangement, only retroreflected light of light emitted by the sensor unit itself can be detected without detecting infrared light of the sensor unit arranged on a facing side.

Figure 4A:
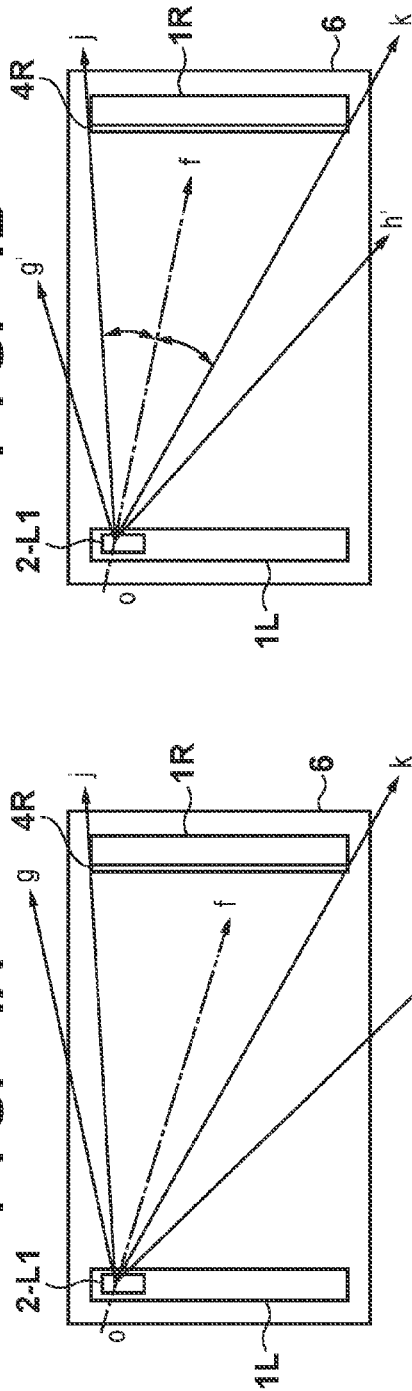
FIG. 4A is a view for explaining rotation of the sensor unit according to the first embodiment.
Figure 4B:
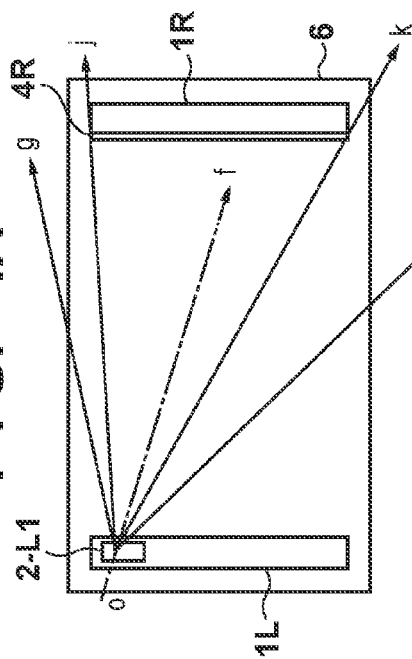
FIG. 4B is a view for explaining rotation of the sensor unit according to the first embodiment.

Assume that the optical axis of the light receiving unit 40 of the sensor unit 2-L1 exists in the direction f, and the range (measurable range) of the field of view is defined by the direction f to the direction g, as shown in FIG. 4A. The retroreflecting member 4R arranged on the facing bar housing unit 1R falls within the field range of the sensor unit 2-L1 over the entire length of the retroreflecting member 4R. Light in directions in the range of j to k in which the retroreflecting member 4R is actually mounted is retroreflected and detected by the light receiving unit 40. This relationship is assumed to be established for all the sensor units 2.

Figure 4C:
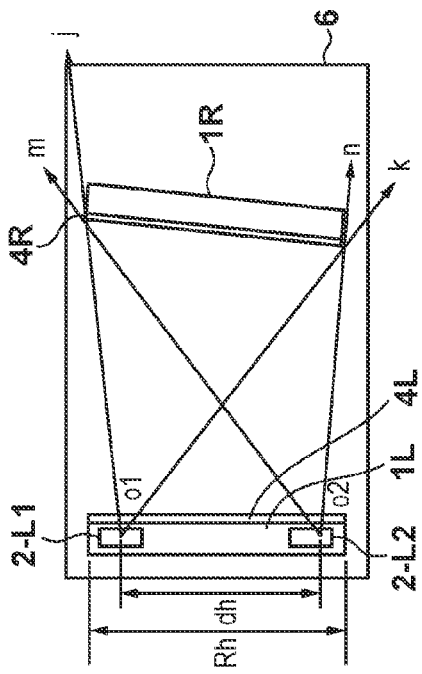
FIG. 4C is a view for explaining rotation of the sensor unit according to the first embodiment.

A signal output from the sensor unit 2 of the bar housing unit 1 will be explained with reference to FIGS. 5A to 5F. In FIGS. 5A to 5F, the abscissa represents the pixel number of the sensor unit serving as the photoelectric converter, and the ordinate represents the voltage value of a light amount detected by the pixel. FIG. 5A shows an output from the light receiving unit 40 when the light projection unit 30 of the sensor unit 2 does not emit light. FIG. 5B shows an output from the light receiving unit 40 when the light projection unit 30 of the sensor unit 2 emits light. In FIG. 5B, a level A is the maximum level of a detected light amount, and a level B is a level at which no light is detected (received). A range of pixel numbers Ng to Nh is a field range detectable by the light receiving unit 40, and symbols g and h correspond to symbols indicating directions in FIGS. 4A to 4D. Since the light receiving unit 40 according to the first embodiment employs a centered optical system, the intermediate pixel number Nf among the pixel numbers Ng to Nh corresponds to the optical axis direction.

An infrared ray emitted by the sensor unit 2 is retroreflected by the retroreflecting member 4 arranged on a facing side, and detected by the sensor unit 2 itself. The direction of the pixel number Nj at which an optical output starts to be obtained is the direction j in FIG. 4A. Similarly, the direction of the pixel number Nf is the direction k in FIG. 4A. The light amount at the pixel number Nj up to the pixel number Nk changes depending on the size and aspect ratio of the display screen, a corresponding arrangement state (especially the distance between the two bar housing units 1) and stretching/contraction state of the bar housing units 1, and the like.

To obtain an optimum light amount level, the coordinate input apparatus according to the first embodiment controls the SH signal to adjust the shutter open time of the line CCD 41 and the exposure time of the infrared LED 31. The time can be set to be short if a light amount obtained from the sensor unit 2 is large, and long if it is small. Further, a current to be supplied to the infrared LED 31 may be adjusted depending on a detected light amount level. The coordinate input apparatus is configured to obtain an optimum light amount by monitoring an output signal in this manner. This adjustment may be performed, as needed, when the level varies. Alternatively, when the bar housing unit 1 is set and holds the state, a predetermined stable signal should be obtained, so the light amount may be adjusted at the time of power-on upon completion of installation.

Referring back to FIGS. 5A to 5F, when the user touches the input surface of the coordinate input effective region 5 and cuts off the optical path, no light amount can be detected at, for example, the pixel number Nc, as shown in FIG. 5C. In the first embodiment, a direction in which the input surface has been touched, that is, an angle is calculated using signals in FIGS. 5A to 5C.

First, reference data is acquired upon activation of the system, upon reset of the system, or automatically. Although data processing of one sensor unit 2 will be explained below, the remaining sensor units also perform the same processing.

Upon power-on, while the operator does not perform a touch operation and the illumination by the light projection unit 30 is OFF, the A/D converter 63 A/D-converts an output from the line CCD 41, and the memory 64 stores the value as Base_Data[N]. This data contains variations of the bias of the line CCD 41 and is data around the level B in FIG. 5A. [N] is the CCD pixel number of the line CCD 41, and a pixel number corresponding to an effective input range is used.

Similarly, a light amount distribution in a state in which the operator does not perform a touch operation and the light projection unit 30 projects light is acquired and stored. This data is data indicated by a solid line in FIG. 5B, and is stored as Ref_Data[N] in the memory 64. The stored two types of data are managed as initial data.

After that, sampling starts. If no touch operation is performed, the data shown in FIG. 5B is obtained. If a touch operation is performed, data shown in FIG. 5C in which a shadow C has been detected in accordance with the touch position is detected. The sample data obtained in the presence of illumination by the light projection unit 30 is defined as Norm_Data[N].

By using these data (Base_Data[N] and Ref_Data[N] stored in the memory 64), the presence/absence of an input from the pointer and the presence/absence of a light shielding portion (light shielding range) are determined. First, to specify a light shielding portion, the absolute amount of a change of data is calculated in each pixel and compared with a preset threshold Vtha:

$$\text{Norm\_Data0}[N]=\text{Norm\_Data}[N]-\text{Ref\_Data}[N] \quad (1)$$

where Norm_Data0[N] is the absolute change amount in each pixel. By comparison with the threshold, a determination error caused by noise or the like is prevented, and a reliable change of a predetermined amount is detected. If data exceeding the threshold is generated in, for example, a predetermined number or more of successive pixels, it is determined that a touch operation has been performed. Since this processing only calculates a difference and compares it, the calculation can be performed within a short time and the presence/absence of an input can be determined quickly.

Then, for higher-accuracy detection, the change ratio of pixel data is calculated, and an input point is determined using equation (2):

$$\text{Norm\_Data}R[N]=\text{Norm\_Data0}[N]/(\text{Base\_Data}[N]-\text{Ref\_Data}[N]) \quad (2)$$

For this pixel data (light amount distribution), a separately set threshold Vthr is applied. Then, the angle is calculated by obtaining, as a pixel corresponding to the input from the pointer, the center between pixel numbers at the leading edge and trailing edge of a light amount variation region corresponding to the light shielding portion in the light amount distribution, which pixel numbers correspond to points crossing the threshold Vthr.

Figure 5A:
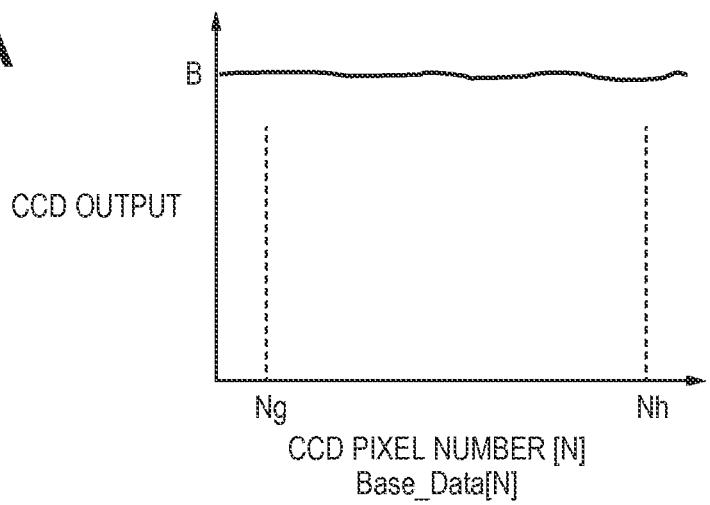
FIG. 5A is a graph for explaining an output from the sensor unit according to the first embodiment.
Figure 5B:
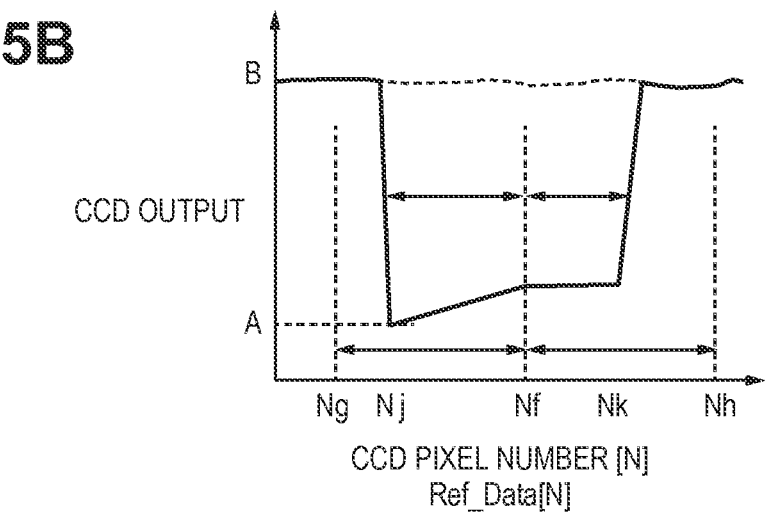
FIG. 5B is a graph for explaining an output from the sensor unit according to the first embodiment.
Figure 5C:
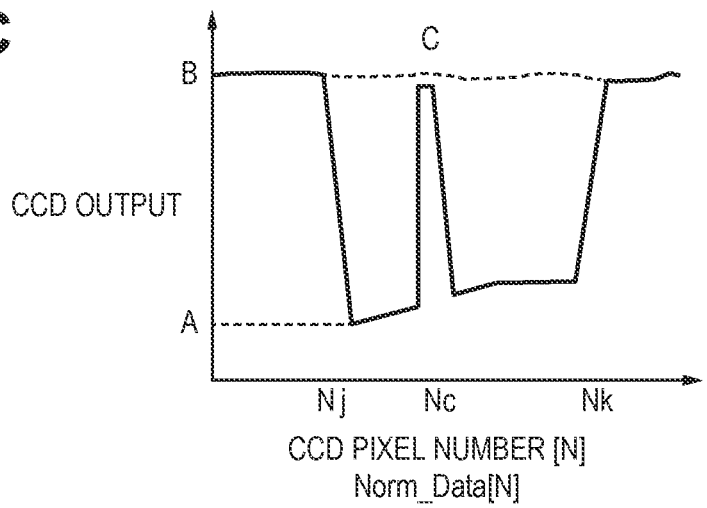
FIG. 5C is a graph for explaining an output from the sensor unit according to the first embodiment.
Figure 5D:
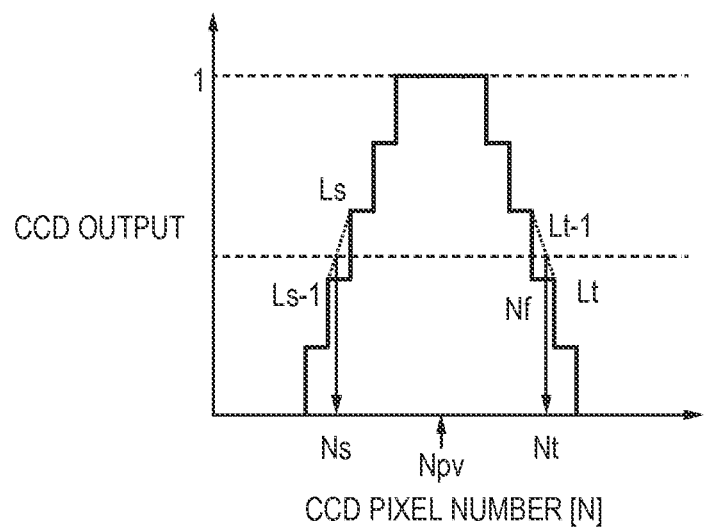
FIG. 5D is a graph for explaining an output from the sensor unit according to the first embodiment.

FIG. 5D exemplifies a detection result after the end of calculating the change ratio. In detection using the threshold Vthr, assume that the leading edge of the light shielding portion reaches a level Ls in the Ns-th pixel and exceeds the threshold Vthr. Further, assume that the data level reaches a level Lt in the Nt-th pixel and becomes lower than the threshold Vthr.

At this time, the pixel number Np of the line CCD 41 that should be output may be calculated as the center value between pixel numbers at the leading and trailing edges, in accordance with equation (3):

$$Np=Ns+(Nt-Ns)/2 \quad (3)$$

In this case, the pixel interval of the line CCD 41 serves as the resolution of the output pixel number.

For higher-resolution detection, a virtual pixel number at which the data level crosses the threshold Vthr is calculated using the data level of each pixel and that of an immediately preceding adjacent pixel.

Letting Ls be the level of the pixel Ns, Ls−1 be that of the pixel Ns−1, Lt be that of the pixel Nt, and Lt−1 be that of the pixel Nt−1, virtual pixel numbers Nsv and Ntv can be calculated as $$Nsv=Ns-1+(Vthr-Ls-1)/(Ls-Ls-1) \quad (4)$$

$$Ntv=Nt-1+(Vthr-Lt-1)/(Lt-Lt-1) \quad (5)$$

According to these calculation equations, virtual pixel numbers corresponding to output levels, that is, pixel numbers finer than those of the line CCD 41 can be acquired. A virtual center pixel Npv between the virtual pixel numbers Nsv and Ntv is determined by equation (6):

$$Npv=Nsv+(Ntv-Nsv)/2 \quad (6)$$

In this fashion, higher-resolution detection can be implemented by calculating virtual pixel numbers crossing the threshold Vthr of the predetermined level from the pixel number of a pixel of a data level crossing the threshold Vthr, an adjacent pixel number, and their data levels.

To calculate the actual coordinate value of the pointer from the thus-obtained center pixel number, the center pixel number needs to be converted into angle information.

In actual coordinate calculation to be described later, it is more convenient to calculate not an angle itself but a tangent value at this angle. Note that a pixel number is converted into $\tan\theta$ by looking up a table or using a transformation. When a high-order polynomial is used as the transformation, the accuracy can be ensured. However, it suffices to determine the order and the like in consideration of the calculation ability, accuracy, and the like.

The use of a fifth-order polynomial will be exemplified. When the fifth-order polynomial is used, six coefficients are necessary, and these coefficient data are stored in a memory such as a nonvolatile memory in shipment or the like. Letting L5, L4, L3, L2, L1, and L0 be the coefficients of the fifth-order polynomial, $\tan\theta$ can be expressed by $$\tan\theta=((((L5*Npr+L4)*Npr+L3)*Npr+L2)*Npr+L1)*Npr+L0 \quad (7)$$

By executing the same calculation for the respective sensor units, respective angle data can be determined. Although $\tan\theta$ is calculated in the above example, angle data itself may be calculated and then $\tan\theta$ may be calculated.

Figure 6A:
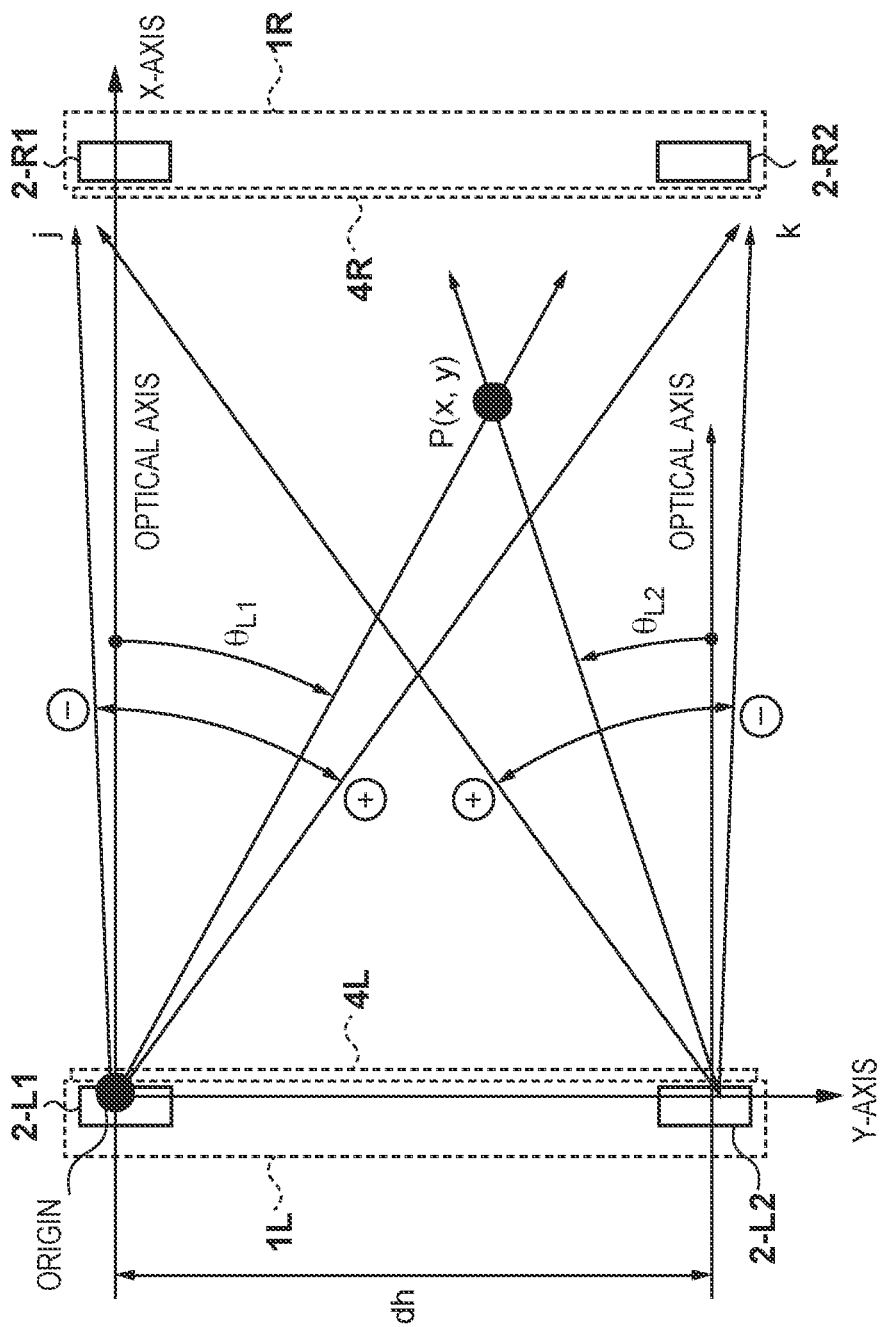
FIG. 6A is a view for explaining calculation of a touch position according to the first embodiment.

FIGS. 6A to 6F are views showing a positional relationship with screen coordinates. The field range of the sensor unit 2-L1 of the bar housing unit 1L is a range of the direction j to the direction k, and the sign of the angle is set as shown in FIG. 6A. The angle reference of the sensor unit 2-L1 is defined as the X-axis direction, and its direction is defined as an angle of 0°. Similarly, the field range of the sensor unit 2-L2 is a range of the direction k to the direction j, and the sign of the angle is set as shown in FIG. 6A. The angle reference of the sensor unit 2-L2 is defined as the X-axis direction, and its direction is defined as an angle of 0°. A line segment connecting the center of the optical axis of the sensor unit 2-L1 and that of the optical axis of the sensor unit 2-L2 is defined as the Y-axis. Then, the angle reference of each sensor unit serves as the normal direction of the line segment. Also, the distance between the center of the optical axis of the sensor unit 2-L1 and that of the optical axis of the sensor unit 2-L2 is defined as dh and has a preset value.

Assume that a touch operation is performed at the position of a point P.

An angle calculated by the sensor unit 2-L1 is $\theta L1$, and an angle calculated by the sensor unit 2-L2 is $\theta L2$. The coordinates of the touch position P can be geometrically calculated using these two pieces of angle information and the distance dh:

$$x=dh\cdot\tan(\pi/2-\theta L2)\cdot\tan(\pi/2-\theta L1)/(\tan(\pi/2-\theta L2)+\tan(\pi/2-\theta L1)) \quad (8)$$

$$y=dh\cdot\tan(\pi/2-\theta L2)/(\tan(\pi/2-\theta L2)+\tan(\pi/2-\theta L1)) \quad (9)$$

Even if an output from one sensor unit is $\theta L1=0$ or $\theta L2=0$, the touch position can be geometrically easily calculated based on angle information output from the other sensor unit.

In the first embodiment, the sensor unit includes the rotation mechanism. Hence, angle information calculated by the sensor unit needs to be corrected by the amount of rotation by the sensor unit. The angle information calculated in accordance with equation (7) is corrected by an angle stored in the moving amount measurement unit 52. The touch position is then calculated using equations (8) and (9).

Figure 6B:
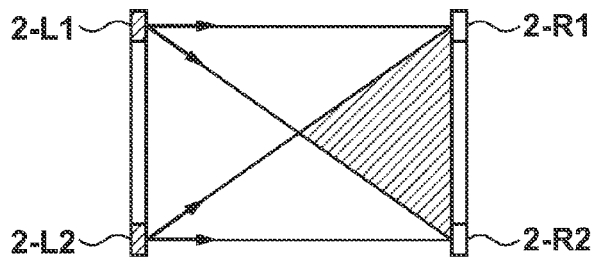
FIG. 6B is a view for explaining calculation of a touch position according to the first embodiment.
Figure 6C:
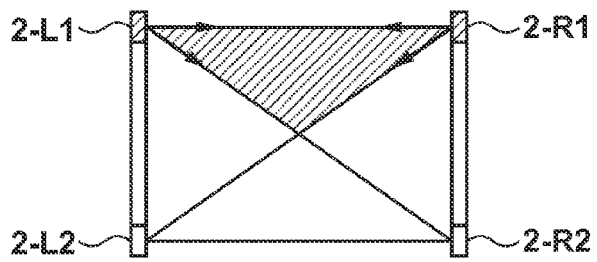
FIG. 6C is a view for explaining calculation of a touch position according to the first embodiment.
Figure 6D:
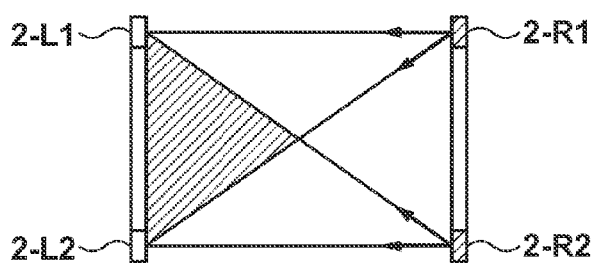
FIG. 6D is a view for explaining calculation of a touch position according to the first embodiment.
Figure 6E:
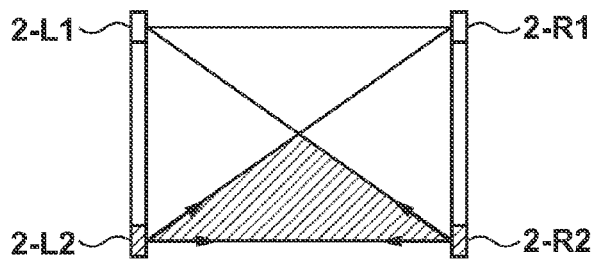
FIG. 6E is a view for explaining calculation of a touch position according to the first embodiment.

The touch position can be calculated only when the touch position P exists in a hatched range in FIG. 6B out of the field ranges of the sensor units 2-L1 and 2-L2. If the touch position falls outside this range, the touch position in the entire coordinate input effective region 5 can be detected by changing a combination of sensor units used for calculation, as shown in FIGS. 6C, 6D, and 6E. Hence, sensor units necessary for coordinate calculation are selected based on the presence/absence of a light shielding direction detected by each sensor unit 2 and the light shielding direction, and then the touch position is calculated. The parameters in equations (8) and (9) are changed in accordance with a combination of the selected sensor units 2, and coordinate transformation is performed.

Figure 6F:
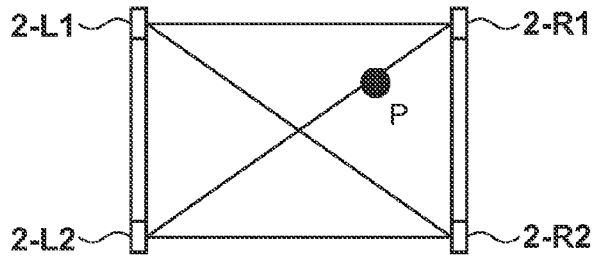
FIG. 6F is a view for explaining calculation of a touch position according to the first embodiment.

When the touch position P exists near a sensor unit selection boundary region, as shown in FIG. 6F, it can be calculated by a combination of sensor units in the state of FIG. 6B or 6C. As a detailed arrangement, for example, the field range of the sensor unit 2-L2 and that of the sensor unit 2-R1 are set to overlap each other in the diagonal direction of the coordinate input effective region 5. When the user touches the overlapping region, the coordinates can be calculated by a plurality of sensor unit combinations. In this case, the average of coordinate values calculated by a combination of sensor units may be output as determined coordinates.

The coordinate input apparatus according to the first embodiment is described on the assumption that the retroreflecting members of the bar housing units arranged at positions where the retroreflecting members face the corresponding sensor units exist in the field ranges of the sensor units over the entire lengths of the retroreflecting members. However, the first embodiment assumes that the user uses the two bar housing units 1 by attaching them to display surfaces of various display sizes. Depending on the way of attaching the bar housing units by the user, the retroreflecting members may be attached outside the field range. The first embodiment has described the retroreflecting members configured to have satisfactory field angles. However, if the field of view cannot be satisfactorily ensured for an optical reason, cost reason, or the like, this poses a serious problem.

Figure 5E:
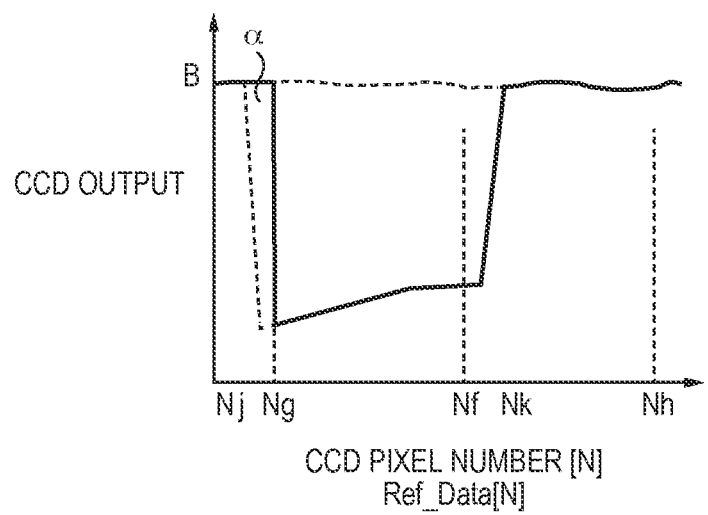
FIG. 5E is a graph for explaining an output from the sensor unit according to the first embodiment.

FIG. 5E shows an output from the sensor unit when part of the retroreflecting member 4 of the bar housing unit arranged at a position where the retroreflecting member 4 faces the corresponding sensor unit falls outside the field range of the sensor unit. At the pixel number Ng corresponding to the field limit, the output signal level rises abruptly. In other words, in a state in which an output signal is suddenly obtained at the field limit (pixel number Ng or Nk), the sensor unit may not receive all light retroreflected by the retroreflecting member 4 arranged at a facing position. This indicates the presence of a region a where retroreflected light cannot be detected in FIG. 5E. In contrast, if outputs at the two field limits (pixel numbers Ng and Nk) are at about the level B and an optical output is obtained in the field range, it can be considered that the sensor unit has received all light retroreflected by the retroreflecting member 4 arranged at a facing position (see FIG. 5B).

In the first embodiment, the rotation mechanism 51, moving amount measurement unit 52, and moving amount determination unit 53 are arranged, as described above. First, the moving amount determination unit 53 determines whether each sensor unit has received all light retroreflected by the retroreflecting member 4 arranged at a facing position. If the sensor unit does not receive all retroreflected light, the moving amount determination unit 53 determines that the rotation amount of the rotation mechanism 51 is improper. Assume that, when retroreflected light may not be received at the field limit pixel number Ng, as shown in FIG. 5E, the problem will be solved by instructing the rotation mechanism 51 to rotate clockwise. In this case, when retroreflected light may not be received at the field limit pixel number Nk, the rotation mechanism 51 is instructed to rotate counterclockwise. Clockwise or counterclockwise rotation can be determined in accordance with an output signal to automatically rotate the rotation mechanism 51. A rotation amount after the rotation is stored and updated as a new rotation amount (moving amount) in the moving amount measurement unit 52.

Note that the rotation mechanism 51 is configured to rotate the sensor unit 2 about the reference point O (reference origin) of angle measurement serving as the center axis. The distance dh between the sensor units does not change upon rotation. If the moving amount determination unit 53 determines that the sensor unit has received all light retroreflected by the retroreflecting member 4 as a result of rotation, the rotation operation stops and the moving amount measurement unit 52 measures the rotation amount. The above-described angle calculation value is corrected by the rotation amount, and then coordinate position calculation processing is performed.

By executing this processing, the light receiving unit 40 of each sensor unit 2 can receive all light retroreflected by the facing retroreflecting member 4, and a touch position (pointed position) in the coordinate input effective region 5 can be detected.

An arrangement to calculate a higher-accuracy touch position will be explained. As described with reference to FIG. 4A, the optical axis of the light receiving unit 40 is the direction f, and the field range is a range of the direction g to the direction h. Assuming that the field range is arranged to be symmetrical about the optical axis f ($\angle$gof=$\angle$hof), the angle detection performance is generally high in the optical axis direction. That is, as the direction moves apart from the optical axis direction, the influence of the lens distortion characteristic becomes large in the peripheral direction, and the angle calculation performance becomes poor.

In FIG. 4A, all light retroreflected by the retroreflecting member 4 of the bar housing unit 1 arranged at a position where the retroreflecting member 4 faces the sensor unit 2 can be received, as described above. To achieve high-accuracy position detection in this state, the sensor unit 2 is rotated to establish $\angle$jof'=$\angle$kof', as shown in FIG. 4C. In this arrangement, light retroreflected by the retroreflecting member 4 can be received at a position of the light receiving unit 40 closer to the optical axis.

Figure 5F:
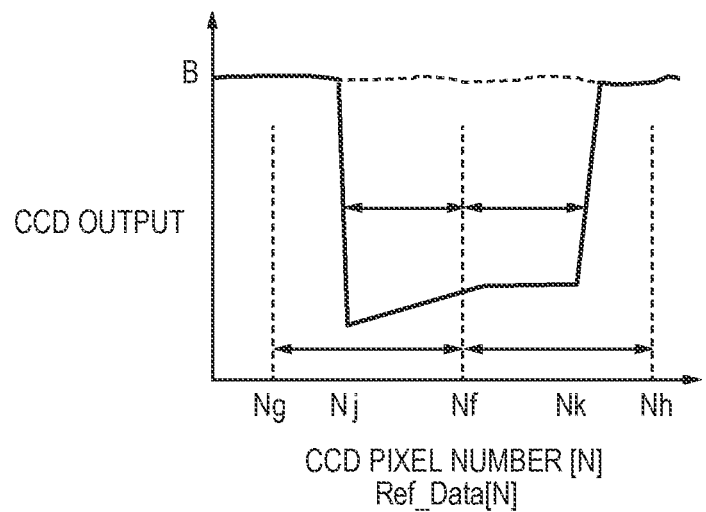
FIG. 5F is a graph for explaining an output from the sensor unit according to the first embodiment.

FIG. 5F shows an output signal in this arrangement. The optical axis direction corresponds to the pixel number Nf, and the field range is a range of the pixel numbers Ng to Nh. As described above, when the optical system of the light receiving unit 40 is a centered optical system, the number of pixels of the pixel numbers Ng to Nf is almost equal to that of pixels of the pixel numbers Nf to Nh. Thus, the pixel number of a middle point position between the pixel number Nj in the direction j and the pixel number Nk in the direction k becomes almost equal to the pixel number Nf representing the optical axis direction. The moving amount determination unit 53 detects this state and stops the rotation operation. In addition, the moving amount measurement unit 52 measures the moving rotation amount, corrects the angle calculation value based on the measurement value, and performs coordinate position calculation processing. In this manner, higher-accuracy position detection can be implemented by automatically adjusting the rotation amount of the sensor unit 2.

The coordinate input apparatus according to the first embodiment is used by installing the bar housing units by the user. The installation state of the bar housing units changes in every installation even on the same whiteboard, and the coordinate input apparatus may be used in the state of FIG. 4C. In the installation state of FIG. 4C, the distance between the bar housing units 1L and 1R is shorter than that in FIG. 4B. Hence, the optical axis direction f' needs to be properly adjusted to establish ∠jof'=∠kof'. This adjustment is performed upon completion of installing the bar housing units 1, and can be executed as initial setting immediately after the coordinate input apparatus is turned on. A separately arranged switch or the like may be used to shift to this adjustment operation, as needed.

Although the rotation mechanism 51 for automatically adjusting the rotation amount, the moving amount measurement unit 52, and the moving amount determination unit 53 have been described, the present invention is not limited to this. As described above, the moving amount determination unit 53 can determine whether the state is optimum, and also determine a direction in which the sensor unit should be rotated to optimize the state. It is also possible to notify the user of the determination result of the moving amount determination unit 53 by using a notification unit such as an indicator, and rotate the sensor unit 2 by a manual operation by the user.

Figure 7A:
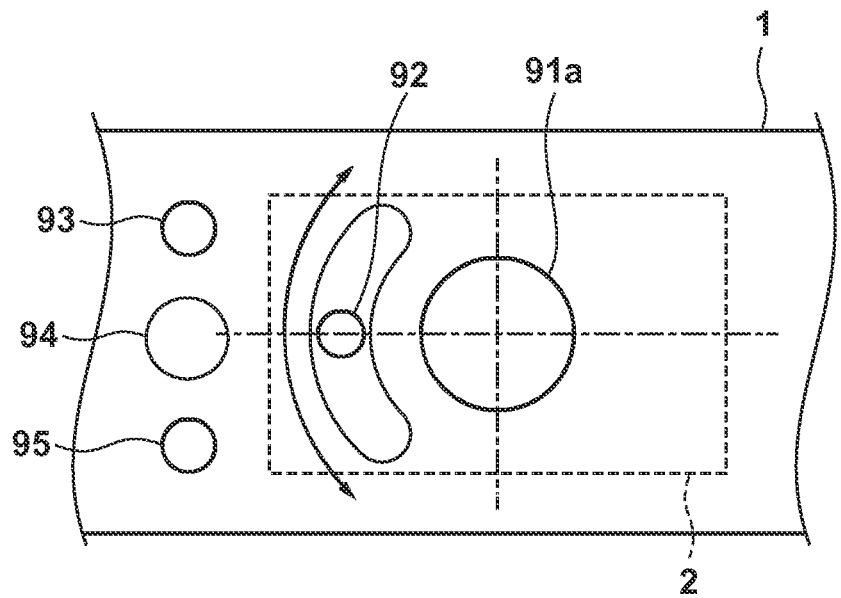
FIG. 7A is a view for explaining a rotation mechanism according to the first embodiment.
Figure 7B:
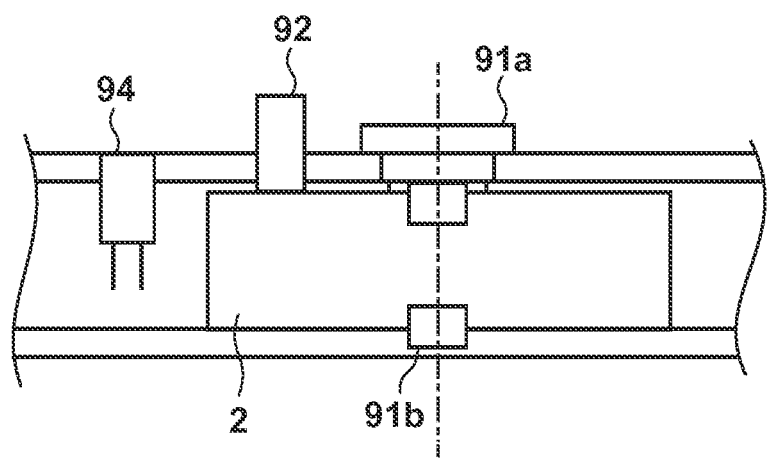
FIG. 7B is a view for explaining a rotation mechanism according to the first embodiment.

FIGS. 7A and 7B show a detailed embodiment in this case. FIG. 7A is a front view, and FIG. 7B is a sectional view. In FIGS. 7A and 7B, reference numerals 91a and 91b denote rotating shafts for rotating the sensor unit 2; and 92, a lever for performing a rotation operation by the user. An indicator to the operator is formed from, for example, an LED 93 indicating clockwise rotation, an LED 95 indicating counterclockwise rotation, and an LED 94 for notifying that the rotation amount is optimum. When the LED 94 is turned on, the rotation amount is optimum and the operation by the user is completed.

The distance between the sensor units 2 (for example, the distance between the sensor units 2-L1 and 2-L2) in the bar housing unit 1 does not change regardless of the rotation operation of the sensor unit 2, and the distance dh is constant. However, to calculate touch positions in the regions of FIGS. 6C and 6E, the distance between the bar housing units 1L and 1R needs to be derived. This is because the distance between the bar housing units 1L and 1R has a value determined by installation by the user.

Figure 4D:
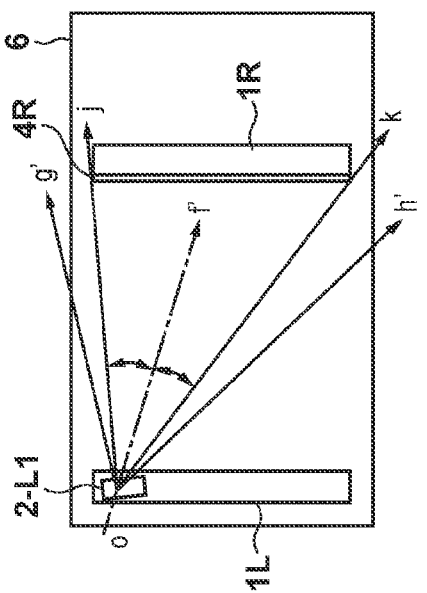
FIG. 4D is a view for explaining rotation of the sensor unit according to the first embodiment.

FIG. 4D is a view for explaining a method of calculating the distance. The overall length of the bar housing unit 1 is Rh, the overall length of the retroreflecting member 4 of the bar housing unit 1 is also equal to Rh, and the two bar housing units have the same shape. First, the angle ∠jO1k of view of the facing retroreflecting member observed by the sensor unit 2-L1 in the bar housing unit 1L, and the angle ∠mO2n of view of the facing retroreflecting member 4 observed by the sensor unit 2-L2 are measured. Since the distance dh is known, the intersection point between the directions j and m and the intersection point between the directions k and n can be geometrically easily calculated. The distance between these intersection points should be equal to the overall length Rh of the bar housing unit 1. It can also be verified whether the positions of the derived intersection points are correct. That is, the arrangement state of the bar housing units, in other words, the geometrical arrangement of the four sensor units can be derived. As a result, touch positions even in the regions of FIGS. 6C and 6E can be calculated.

Figure 8A:
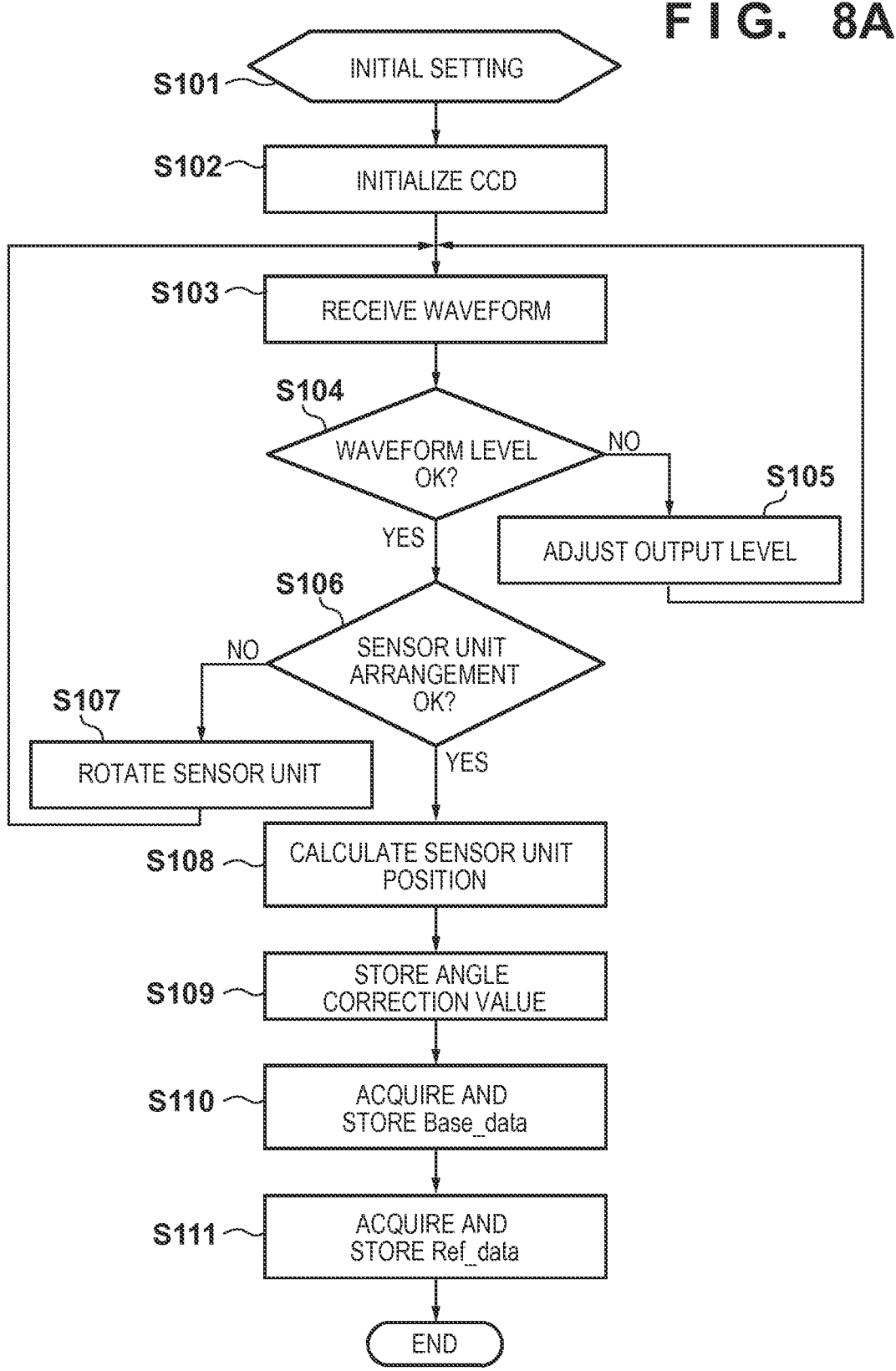
FIG. 8A is a flowchart for explaining an operation of the sensor unit according to the first embodiment.

FIG. 8A is a flowchart showing initial setting processing after power-on.

First, to form the rectangular coordinate input effective region 5 including the entire display region serving as a projected image, when the operator attaches the bar housing units 1 to the whiteboard 6, the arithmetic control circuit 3 performs initial setting upon power-on (step S101).

Then, the arithmetic control circuit 3 performs various initial settings regarding the coordinate input apparatus such as port setting of the CPU 61 and timer setting. In addition, the arithmetic control circuit 3 also initializes the line CCD 41 to, for example, remove unwanted charges remaining in the photoelectric converter (step S102). The arithmetic control circuit 3 optimizes a light amount to be detected by the line CCD 41. As described above, the size of the display region changes depending on the size of the whiteboard on which the display region is displayed. Even in this case, the user appropriately sets the distance between the bar housing units 1 by stretching or contracting the bar housing units 1. Since the intensity of detected light (output signal of the line CCD 41) changes depending on the state of attachment, the output signal (output waveform) of the light receiving unit upon illumination by the light projection unit 30 is detected first.

Then, the arithmetic control circuit 3 determines whether the detection signal (waveform) level is optimum (step S104). If the arithmetic control circuit 3 determines that the waveform level is improper (NO in step S104), it adjusts the shutter open time of the line CCD, the exposure time of the infrared LED, or the driving current of the infrared LED (step S105), and detects the output signal of the line CCD again (step S103). This operation is repeated, and if the arithmetic control circuit 3 determines that the waveform level is optimum (YES in step S104), it determines whether the rotation amount of the sensor unit falls within a predetermined range (step S106). Determination of whether the rotation amount of the sensor unit falls within a predetermined range has been described above with reference to FIGS. 4A to 4D or 5A to 5F. If the arithmetic control circuit 3 determines that the rotation amount of the sensor unit falls outside the predetermined range (NO in step S106), it rotates the sensor unit so that its rotation amount falls within the predetermined range (step S107). The arithmetic control circuit 3 then checks the detection signal waveform after the rotation (steps S103 and S104).

If the arithmetic control circuit 3 determines that the rotation amount of the sensor unit falls within the predetermined range (YES in step S106), the arithmetic control circuit 3 calculates geometrical positional information of each sensor unit, as described with reference to FIG. 4D (step S108). The arithmetic control circuit 3 stores, in the moving amount measurement unit 52, a rotation amount measured by the moving amount measurement unit 52 as an angle correction value for coordinate calculation (step S109). The arithmetic control circuit 3 acquires a signal Base_Data[N] (see FIG. 5A) in the absence of illumination, and stores it in the memory 64 (step S110). Then, the arithmetic control circuit 3 acquires a signal Ref_Data[N] (see FIG. 5B) in the presence of illumination, and stores it in the memory 64 (step S111).

To simplify the description, the operation of only one sensor unit 2 has been explained. However, this initial setting is performed for all sensor units to be used (four sensor units in the first embodiment).

FIG. 8B is a flowchart showing a normal sampling operation after initial setting processing.

The arithmetic control circuit 3 executes the initial setting processing in FIG. 8A (step S101). Then, the retroreflecting member 4 mounted on the facing bar housing unit 1 retroreflects infrared light projected by the sensor unit 2, and the arithmetic control circuit 3 detects a signal obtained when the light receiving unit 40 of the arithmetic control circuit 3 itself has detected the light (step S201). The data at this time is Norm_data[N]. If a touch operation is performed and cuts off the optical path, no optical signal can be detected near the pixel number Nc, as shown in FIG. 5C.

The arithmetic control circuit 3 determines whether any sensor unit 2 has generated such a light shielding portion, that is, the presence/absence of an input (step S202). If the arithmetic control circuit 3 determines that there is no input (NO in step S202), the process returns again to step S201 to repeat sampling. If the arithmetic control circuit 3 determines that there is an input (YES in step S202), it selects sensor units which have generated light shielding portions in the output signal (step S203). By using the selected sensor units, the arithmetic control circuit 3 calculates the directions (angles) in which the light shielding portions have been generated (step S204). The arithmetic control circuit 3 corrects angles by the rotation angle stored in the moving amount measurement unit 52 (step S205). Based on the corrected angles, the arithmetic control circuit 3 calculates the coordinates of the touch position in the digitizer coordinate system (step S206). Accordingly, the calculated touch position coordinates can be transformed into coordinates in the screen coordinate system by using transformation parameters, and the coordinate values can be output (transmitted) to an external device such as a personal computer.

As described above, according to the first embodiment, the field range of the sensor unit can be appropriately adjusted by arranging the rotation mechanism for the sensor unit. An arbitrary plane can be used as a coordinate input plane. Even if the installation by the user is rough, a touch position can be detected at high accuracy. The installation time can be greatly shortened, and the coordinate input apparatus can be used quickly.

Second Embodiment

The second embodiment will be explained with reference to FIGS. 9A and 9B. The first embodiment has described an arrangement in which the sensor units 2 are rotated to set all the facing retroreflecting members 4 so as to fall within the field ranges of the light receiving units 40. The second embodiment will explain an arrangement in which bar housing units 1 are stretched/contracted to set all facing retroreflecting members 4 so as to fall within the field ranges of light receiving units 40.

FIGS. 9A and 9B show the schematic arrangement of a bar housing unit 1L. Although attention is paid to the bar housing unit 1L in FIGS. 9A and 9B, a bar housing unit 1R also has the same arrangement.

The bar housing unit 1L is formed from an upper housing case 81 and lower housing case 82. Reference numeral 83 denotes an outer pipe; and 84, an inner pipe. The inner shape of the outer pipe 83 and the outer shape of the inner pipe 84 almost fit with each other. The outer pipe 83 is fixed to the upper housing case 81, and the inner pipe 84 is fixed to the lower housing case 82. When the bar housing unit 1L is stretched/contracted by the upper housing case 81 and lower housing case 82, the outer pipe 83 and inner pipe 84 slide while maintaining the fitting relationship (see FIG. 9B). In this manner, the bar housing units 1L and 1R in the second embodiment include the sliding mechanism of moving the positions of sensor units incorporated in the bar housing unit in the longitudinal direction.

In the second embodiment, these pipes are made of a metal to obtain the stretching/contraction direction and mechanical strength of the bar housing unit 1L in the stretching/contraction operation. One end of the metal pipe is drawn and flattened. At this portion, the pipe is mechanically coupled to the housing, and a sensor unit 2 is mounted.

Note that stretching/contraction may be performed by using a driving mechanism such as a motor or by a manual operation by the user. In the second embodiment, the moving amount measurement unit 52 in the first embodiment is used as a moving amount measurement unit for measuring the stretching/contraction amount of the bar housing unit and storing the moving amount. Based on the processes described with reference to FIGS. 4A to 4D and 5A to 5F in the first embodiment, a moving amount determination unit 53 determines whether all the facing retroreflecting members 4 fall within the field ranges of the respective sensor units 2.

As described above, according to the second embodiment, the same effects as those in the first embodiment can be obtained by arranging the mechanism for stretching/contracting the bar housing unit 1.

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-173281, filed Aug. 3, 2012, which is hereby incorporated by reference herein in its entirety.

What is claimed is:

1. A coordinate input apparatus in which a first bar housing unit and a second bar housing unit each including a retroreflecting member and at least two sensor units, the sensor units each being movable in a horizontal direction with respect to a coordinate input region and each including a light projecting unit and a light receiving unit, are arranged on two facing sides of the coordinate input region to make the retroreflecting members face each other for detecting a pointed position in the coordinate input region, comprising:

a determination unit configured to determine, based on a light amount distribution received by the light receiving unit of each of the sensor units, whether the sensor units are at appropriate positions;

a measurement unit configured to measure moving amounts of the sensor units in a horizontal direction with respect to the coordinate input region when said determination unit determines that the sensor units are at appropriate positions; and a calculation unit configured to calculate coordinates of the pointed position in the coordinate input region based on the light amount distribution received by the light receiving unit and the moving amounts in a horizontal direction with respect to the coordinate input region measured by said measurement unit.

2. The apparatus according to claim 1, wherein, based on whether the sensor units receive light retroreflected by the facing retroreflecting member, said determination unit determines whether the sensor units are at appropriate positions.

3. The apparatus according to claim 1, further comprising rotation mechanisms each configured to rotate about a reference origin of each of the sensor units.

4. The apparatus according to claim 1, further comprising sliding mechanisms configured to slide the sensor units.

5. The apparatus according to claim 1, further comprising a notification unit configured to notify a determination result of said determination unit.

6. A method of controlling a coordinate input apparatus in which a first bar housing unit and a second bar housing unit each including a retroreflecting member and at least two sensor units, the sensor units each being movable in a horizontal direction with respect to a coordinate input region and each including a light projecting unit and a light receiving unit, are arranged on two facing sides of the coordinate input region to make the retroreflecting members face each other for detecting a pointed position in the coordinate input region, comprising:

a determination step of determining, based on a light amount distribution received by the light receiving unit of each of the sensor units, whether the sensor units are at appropriate positions a measuring step of measuring moving amounts of the sensor units in a horizontal direction with respect to the coordinate input region when said determination step determines that the sensor units are at appropriate positions; and a calculation step of calculating coordinates of the pointed position in the coordinate input region based on the light amount distribution received by the light receiving unit and the moving amounts in a horizontal direction with respect to the coordinate input region measured by said measurement unit.

7. A non-transitory computer-readable storage medium storing a program for causing a computer to control a coordinate input apparatus in which a first bar housing unit and a second bar housing unit each including a retroreflecting member and at least two sensor units, the sensor units each being movable in a horizontal direction with respect to a coordinate input region and each including a light projecting unit and a light receiving unit, are arranged on two facing sides of the coordinate input region to make the retroreflecting members face each other for detecting a pointed position in the coordinate input region, the program causing the computer to function as a determination unit configured to determine, based on a light amount distribution received by the light receiving unit of each of the sensor units, whether the sensor units are at appropriate positions;

a measurement unit configured to measure moving amounts of the sensor units in a horizontal direction with respect to the coordinate input region when said determination unit determines that the sensor units are at appropriate positions; and a calculation unit configured to calculate coordinates of the pointed position in the coordinate input region based on the light amount distribution received by the light receiving unit and the moving amounts in a horizontal direction with respect to the coordinate input region measured by said measurement unit.

8. A coordinate input apparatus in which a first bar housing unit and a second bar housing unit each including a retroreflecting member and at least two sensor units, the sensor units each being rotatable in a horizontal direction with respect to a coordinate input region and each including a light projecting unit and a light receiving unit, are arranged on two facing sides of the coordinate input region to make the retroreflecting members face each other, for projecting light by each light projecting unit of the sensor units of the first and second bar housing units and receiving light reflected at a facing retroreflecting member by each light receiving unit of the sensor units of the first and second bar housing units, and for detecting a pointed position in the coordinate input region, comprising:

a measurement unit configured to measure angles of the sensor units in a horizontal direction with respect to the coordinate input region;

a determination unit configured to determine, based on a light amount distribution received by the light receiving unit of each of the sensor units of the first and second bar housing units, whether each retroreflecting member which face each of the sensor units is located within a range of field of view of each of the sensor units; and a calculation unit configured to calculate coordinates of the pointed position in the coordinate input region based on a light amount distribution received by the light receiving unit of each of the sensor units of the first and second bar housing units, and angles of the sensor units in a horizontal direction with respect to the coordinate input region measured by the measurement unit in a case where it is determined by the determination unit that each retroreflecting member which face each of the sensor units is located within a range of field of view of each of the sensor units.

9. The apparatus according to claim 8, further comprising a notification unit configured to notify a determination result of said determination unit.

10. A coordinate input apparatus in which a first bar housing unit and a second bar housing unit each including a retroreflecting member and at least two sensor units, wherein the first bar housing unit and the second bar housing unit are configured such that the distance between the at least two sensor units is extendable, the sensor units each including a light projecting unit and a light receiving unit, are arranged on two facing sides of the coordinate input region to make the retroreflecting members of the first and second bar housing units face each other, for projecting light by each light projecting unit of the sensor units of the first and second bar housing units and receiving light reflected at a facing retroreflecting member by each light receiving unit of the sensor units of the first and second bar housing units, and for detecting a pointed position in the coordinate input region, comprising:

a measurement unit configured to measure stretching/contraction amounts of the sensor units;

a determination unit configured to determine, based on a light amount distribution received by the light receiving unit of each of the sensor units of the first and second bar housing units, whether each retroreflecting member which face each of the sensor units is located within a range of field of view of each of the sensor units; and a calculation unit configured to calculate coordinates of the pointed position in the coordinate input region based on a light amount distribution received by the light receiving unit of each of the sensor units of the first and second bar housing units, and the stretching/contraction amounts measured by the measurement unit in a case where it is determined by the determination unit that each retroreflecting member which face each of the sensor units is located within a range of field of view of each of the sensor units.

11. The apparatus according to claim 10, further comprising a notification unit configured to notify a determination result of said determination unit.

* * * * *